United States Patent [19]
Carswell et al.

[11] Patent Number: 5,365,591
[45] Date of Patent: Nov. 15, 1994

[54] SECURE CRYPTOGRAPHIC LOGIC ARRANGEMENT

[75] Inventors: Phillip A. Carswell, Mesa; Steven F. Clark, Tempe, both of Ariz.

[73] Assignee: Motorola, Inc., Schaumburg, Ill.

[21] Appl. No.: 143,036

[22] Filed: Oct. 29, 1993

[51] Int. Cl.$^5$ ............................................. H04K 1/00
[52] U.S. Cl. ....................................... 380/49; 380/50; 380/28; 380/2
[58] Field of Search .................... 380/2, 28, 36, 37, 43, 380/49, 50

[56] References Cited

U.S. PATENT DOCUMENTS

| | | | |
|---|---|---|---|
| 4,543,646 | 9/1985 | Ambrosius, III et al. | 380/49 X |
| 4,987,595 | 1/1991 | Marino, Jr. et al. | 380/50 |
| 5,144,664 | 9/1992 | Esserman et al. | 380/2 X |
| 5,222,141 | 6/1993 | Killian | 380/49 X |
| 5,303,293 | 4/1994 | Bettenhausen | 380/2 |

FOREIGN PATENT DOCUMENTS 015941  5/1987  Japan .................................. 380/2

OTHER PUBLICATIONS

Gillett, J. B.; "Checking Data Encryption Engines"; IBM Technical Disclosure; vol. 25, No. 9; Feb. 1983.

*Primary Examiner*—Tod R. Swann
*Attorney, Agent, or Firm*—Frank J. Bogacz

[57] ABSTRACT

A secure cryptographic logic arrangement immediately halts the processing of its internal processors upon detection of a single fault. The cryptographic logic arrangement has an arithmetic logic unit, permuter, and a non-linear combiner. A total self-checking controller monitors each of the arithmetic logic unit, permuter, and non-linear combiner to determine whether a fault has occurred in any one of its internal processors. The total self-checking controller employs a scheme of transmitting a pseudorandom signal to each of the internal processors and compares a phase of the pseudorandom signal received back from each of the internal processors to determine whether a fault exists.

22 Claims, 6 Drawing Sheets

SECURE CRYPTOGRAPHIC LOGIC ARRANGEMENT

BACKGROUND OF THE INVENTION

The present invention pertains to secure telecommunications and more particularly to a cryptographic logic arrangement for providing terminal-to-terminal encryption/decryption security for a cryptographic engine or processor.

Conventional wireline or wireless telecommunications are susceptible to interception and theft of the data being transmitted. In order to prevent the theft of information in both wireless and wireline configurations, information is encrypted before it is transmitted from one terminal and decrypted when it is received at another terminal. Encryption/decryption of transmitted information provides additional security in a telecommunication such that if the information is intercepted by an unauthorized person, it is not readily understandable by that person. Decryption of stolen data may be very difficult or impossible with certain complex encryption algorithms.

Due to the sophisticated encryption algorithms that may be used, the performance of the cryptographic encryption/decryption units is adversely affected. In addition, present day cryptographic units may suffer failure and transmit unencrypted data which may seriously compromise the integrity of the secure telecommunication system.

Further, these cryptographic engines or processors typically have several different kinds of processors to perform various functions during the encryption or decryption. Detecting faults in this myriad of processors is difficult at best. Often times these processors are specifically allocated to perform specific functions in the encryption/decryption process.

It would be highly desirable to have a cryptographic logic unit with many flexibly driven processors and a fault detection arrangement for rapid detection of faults throughout a number of processors of a cryptographic logic arrangement and preventing the transmission of any unencrypted information.

SUMMARY OF THE INVENTION

In accordance with the present invention, a novel secure cryptographic logic arrangement is shown. The secure cryptographic logic arrangement has a crypto processor for transmitting and receiving plain text data and cipher text data. The crypto processor converts the cipher text data to plain data and the plain text data to cipher text data. The crypto processor has two input buses and an output bus. The crypto processor also has a number of processors, among them an arithmetic logic unit, a permuter, and a non-linear combiner. The arithmetic logic unit is coupled to the two input buses and to the output bus. The permuter is coupled in parallel with the arithmetic logic unit to the two input buses and to the output bus. The non-linear combiner is coupled in parallel with the arithmetic logic unit and with the permuter to the two input buses and to the output bus. The crypto processor also has a total self-checking controller which is coupled to the arithmetic logic unit, to the permuter, and to the non-linear combiner. The total self-checking controller halts the processing of the arithmetic logic unit, permuter, and non-linear combiner in response to a detection of a fault in the crypto processor.

DESCRIPTION OF THE PREFERRED EMBODIMENT

Figure 1:
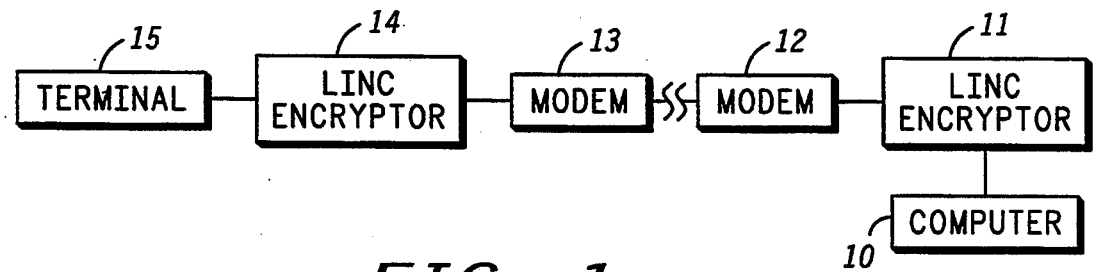
FIG. 1 is a block diagram of processors communicating in accordance with the present invention.

FIG. 1 depicts a typical environment for a cryptographic logic unit in accordance with the present invention. A computer 10 is shown coupled to a terminal 15. This coupling occurs from a connection of computer 10 to link encryptor 11 and from link encryptor 11 to modem 12. Modem 12 is coupled through a transmission line to modem 13. Modem 13 is connected to link encryptor 14 which in turn is connected to terminal 15. The cryptographic logic unit is included in each of the link encryptors 11 and 14. Each of the link encryptors 11 and 14 has a black portion which handles cipher text data and a red portion which handles plain text data.

Plain text data is data which is directly readable by an observer and is not encoded in any way. Cipher text data is data which is encoded and if read in the encoded state would not provide any information. Computer 10 manipulates plain text data. When computer 10 wishes to transmit information to terminal 15, computer 10 sends a message to link encryptor 11 in plain text. Link encryptor 11 converts the plain text to cipher text and transmits the cipher text message to modem 11. Modem 12 via transmission line transmits the cipher text information to modem 13. Modem 13 transmits the cipher text message to link encryptor 14. Link encryptor 14 decrypts the message and produces a plain text message. Link encryptor 14 transmits this plain text message to terminal 15 for its use. The process would be reversed if terminal 15 were transmitting a message to computer 10.

Figure 2:
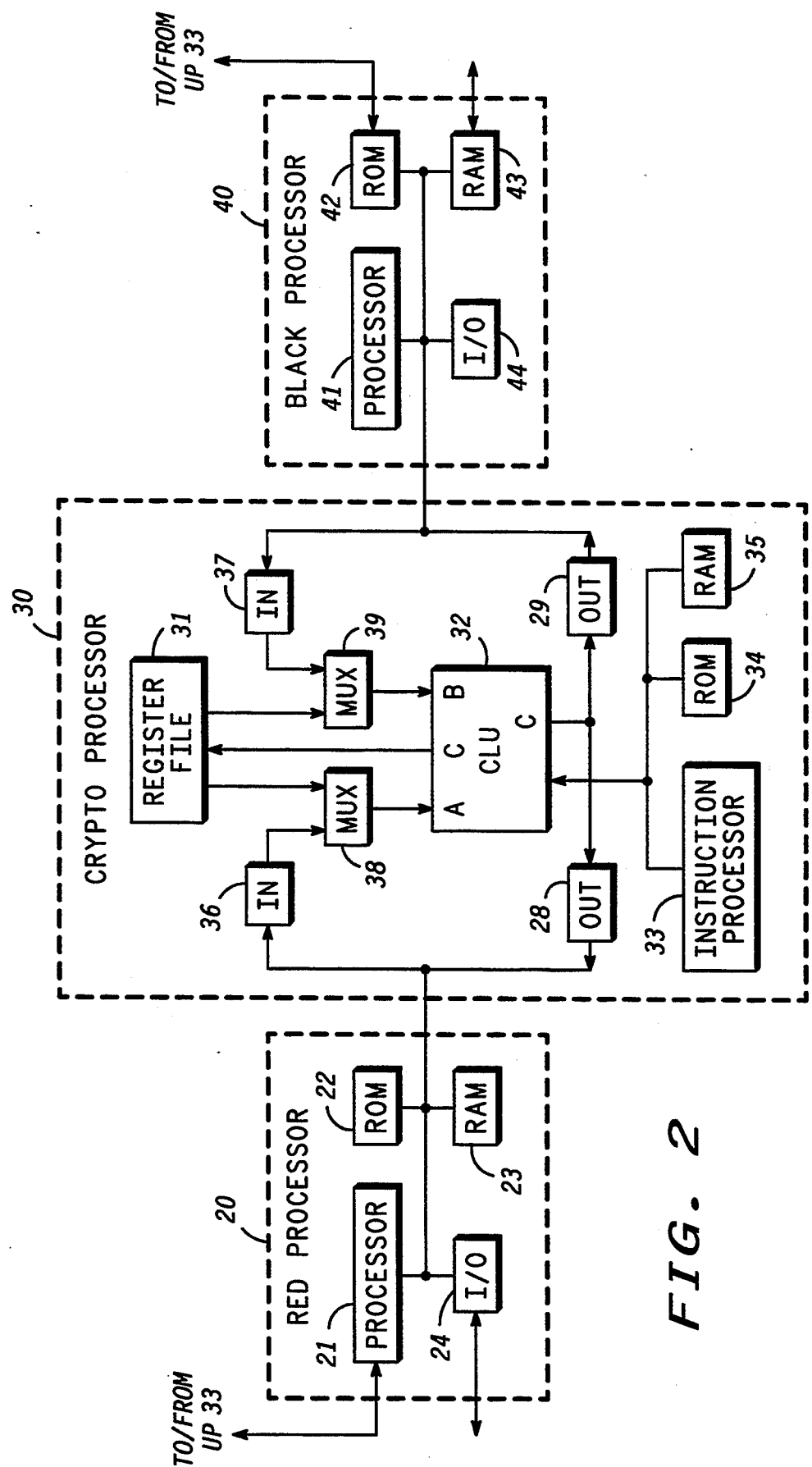
FIG. 2 is a block diagram of an encryptor/decryptor in accordance with the present invention.

FIG. 2 is a block diagram of the link encryptors 11 and 14 of FIG. 1 shown in detail. Each of the link encryptors 11 and 14 include a red processor 20, a crypto processor 30, and black processor 40.

Red processor 20 includes processor 21 coupled to ROM 22, RAM 23, and input/output (I/O). I/O 24 couples either to terminal 15 or computer 10 as the case may be. In addition, processor 21 is coupled to instruction processor 33 of the crypto processor 30. Instruction processor 33 may be programmed to implement various encryption/decryption algorithms, such as, Data Encryption System (DES) or other algorithms, even classified ones.

Black processor 40 includes processor 41 coupled to ROM 42, RAM 43, and to input/output (I/O) 44. Input/output 44 is coupled to modem 12 or 13 as the case may be. In addition, processor 41 is coupled to instruction processor 33 of crypto processor 30 for the transmission and reception of various commands.

Crypto processor 30 includes register file 31 which is coupled from cryptographic logic unit (CLU) 32 and coupled to CLU 32 via multiplexers 38 and 39.

Crypto processor 30 further includes microprocessor 33 which is coupled to ROM 34, RAM 35, and to CLU 32. The plain text output of CLU 32 is coupled through output buffer 28 to microprocessor 21, ROM 22, RAM 23, and I/O 24 of red processor 20. The cipher text output of CLU 32 is transmitted through output buffer 29 to microprocessor 41, ROM 42, RAM 43, and I/O 44 of black processor 40.

Plain text from red processor 20 is transmitted through input buffer 36, through multiplexer 38 to CLU 32. Similarly, cipher text data is transmitted from black processor 40 through input buffer 37, through multiplexer 39, to CLU 32. Multiplexer 38 selects data from red processor 20 or register file 31 for transmission to CLU 32. Similarly, multiplexer 39 selects cipher text data from processor 40 through input buffer 37 and multiplexer 39 to CLU 32 or data from register file 31 for transmission to CLU 32. Register file 31 stores the intermediate results of a particular encryption/decryption algorithm, such as DES.

The cryptographic conversion from plain to red text data is performed within crypto processor 30. CLU 32 cyclically receives instructions to control the execution of the encryption algorithm from microprocessor 33.

Figure 3:
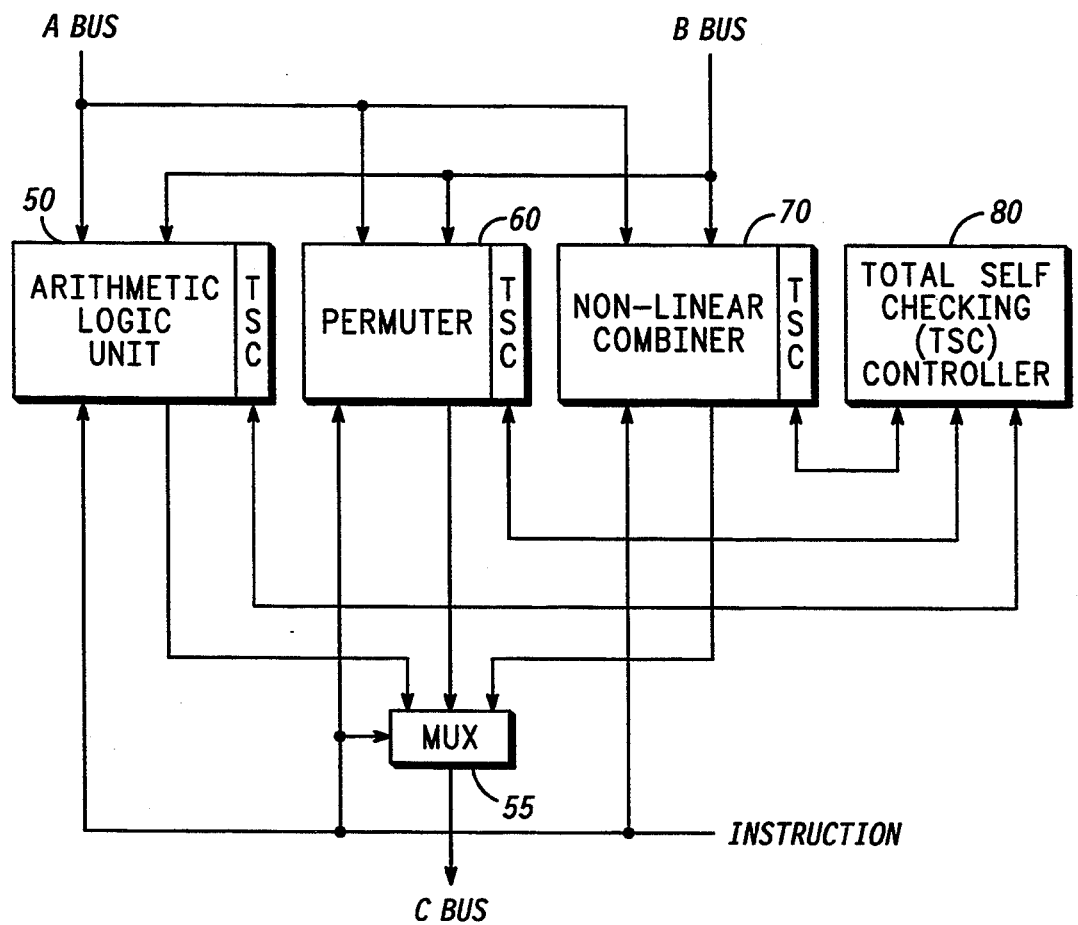
FIG. 3 is a block diagram of the cryptographic logic unit of FIG. 2.

Referring to FIG. 3, a block diagram of CLU 32 of FIG. 2 is shown. As inputs CLU 32 has the A bus, B bus and the C bus is the output. Also CLU 32 receives instructions on the instruction bus.

CLU 32 includes arithmetic logic unit 50, permuter 60, and non-linear combiner 70. The arithmetic logic unit 50, permuter 60, and non-linear combiner 70 are each coupled in parallel to the A bus and to the B bus respectively. Arithmetic logic unit 50, permuter 60, and non-linear combiner 70 are coupled through multiplex 55 to the C bus. The C bus is the output of the crypto processor 30 and also couples CLU 32 to register file 31.

In addition, total self-checking (TSC) controller 80 is coupled to a TSC circuit in each of the arithmetic logic unit 50, permuter 60, and non-linear combiner 70. Instruction bus couples microprocessor 33 to arithmetic logic unit 50, permuter 60, non-linear combiner 70, and multiplexer 55.

Arithmetic logic unit (ALU) supports both Boolean and arithmetic operations. ALU 50 performs bit-wise Boolean functions of the A and B bus inputs (e.g. logical AND, logical OR, and logical INVERT). ALU 50 also performs arithmetic functions of the A and B bus inputs (e.g. add, add with carry, subtract, and subtract with carry).

Permuter 60 performs permutations on data based on the contents of pre-configured permuter controlled RAM (not shown) internal to permuter 60. Multiple permutations may be pre-configured into the permuters control RAM at initialization time prior to algorithm execution by the CLU 32. The instruction bus provides input selection for performing the permutation operations by permuter 60. Each instruction on the instruction bus enables permuter 60 to perform one of the pre-configured permutations.

Non-linear combiner (NLC) 70 enhances the performance of CLU 32 by performing multiple non-linear combination operations simultaneously. Non-linear combinations are performed by a table lookup scheme. The lookup tables are included in a RAM (not shown) internal to non-linear combiner 70. The lookup tables are pre-configured into the RAM at initialization time prior to algorithm execution.

CLU 32 utilizes a distributed total self-checking logic scheme to insure fail-safe operation. This scheme provides an on-line checking mechanism that will detect any single failure in the CLU 32 functional units, ALU 50, permuter 60, and NLC 70. Upon a failure detection by the TSC controller 80, TSC controller disables the outputs of CLU 32 on the C bus. Failures may arise in any of the functional units, ALU 50, permuter 60, or NLC 70. Disabling the outputs of the C bus prevents unsecured CLU 32 operation. Distributed total self-checking logic scheme provides continuous on-line real time failure monitoring which eliminates an on-line window of vulnerability of traditional secure telecommunication systems which utilize off-line alarm check procedures. Each of the CLU 32 functional units include a separate total self-checking circuit. The distributed total self-checking logic technique minimizes the gate delay of each of the components of TSC controller 80. This allows the CLU 32 to operate at higher speeds than traditional non-distributed checking architectures.

Figure 4:
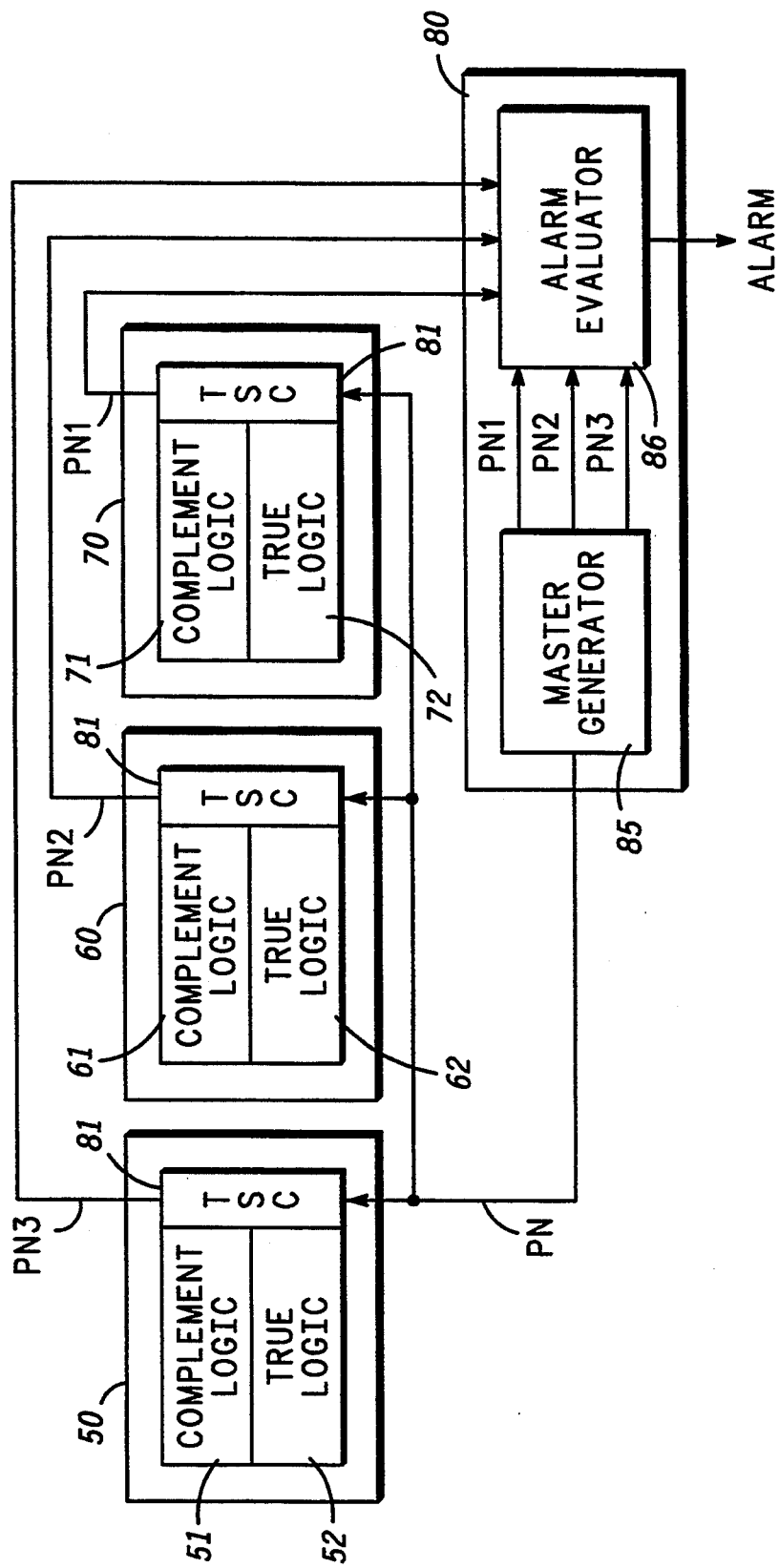
FIG. 4 is a block diagram of a total self-checking arrangement in accordance with the present invention.

Referring for FIG. 4, a block diagram of the distributed total self-checking logic scheme is shown. This scheme provides a high level of confidence in the ability to detect any single failure in any of the functioning units, ALU 50, permuter 60, and NLC 70, as well as a failure in the total self-checking logic itself. The total self-checking logic scheme monitors the output of redundant logic functions during normal operation. This scheme generates an error indication within one clock cycle if the outputs of the functional units are not complementary. Each functional unit 50–70 includes total self-checking circuitry 81 which provides exclusive on-line error checking for that particular functional unit. Each total self-checking circuit 81 is configured to generate a unique phase of an input sequence. The input sequence is generated by master generator 85 of total self-checking controller 80 and transmitted to each of the TSC circuits via the PN lead. Master generator 85 also includes redundant linear sequence generators that internally generate all phases PN1–PN3 of the master sequence PN. Master generator 85 transmits all phases of the basic PN signal on the PN1–PN3 leads to alarm evaluator 86. Each total self-checking circuit 81 of each functional unit 50–70 also generates a unique phase of the master sequence transmitted on the PN lead. This occurs from examining the complement logic 51 and true logic 52 outputs of ALU 50, the complement logic 61, and true logic 62 outputs of permuter 60; and the complement 71 and true logic 72 outputs of NLC 70.

Each TSC 81 of functional units 50–70 produces its own unique phase. That is, TSC 81 of ALU 50 produces PN3; TSC 81 of permuter 60 produces PN2; and TSC 81 of NLC 70 produces PN1. These signals are transmitted via the corresponding leads PN1–PN3 to alarm evaluator 86 of TSC controller 80. Alarm evaluator 86 continually compares the internally generated sequences P1–P3 of master generator 85 with the sequences generated by each TSC 81 of functional units 50-70. If any miscomparison occurs in any of the functional units 50-70 or in the TSC controller 80, one or more of the sequences will not correctly compare. This condition is detected by alarm evaluator 86. As a result, alarm evaluator 86 outputs the alarm signal which disables the C bus from producing any output signals.

Figure 5:
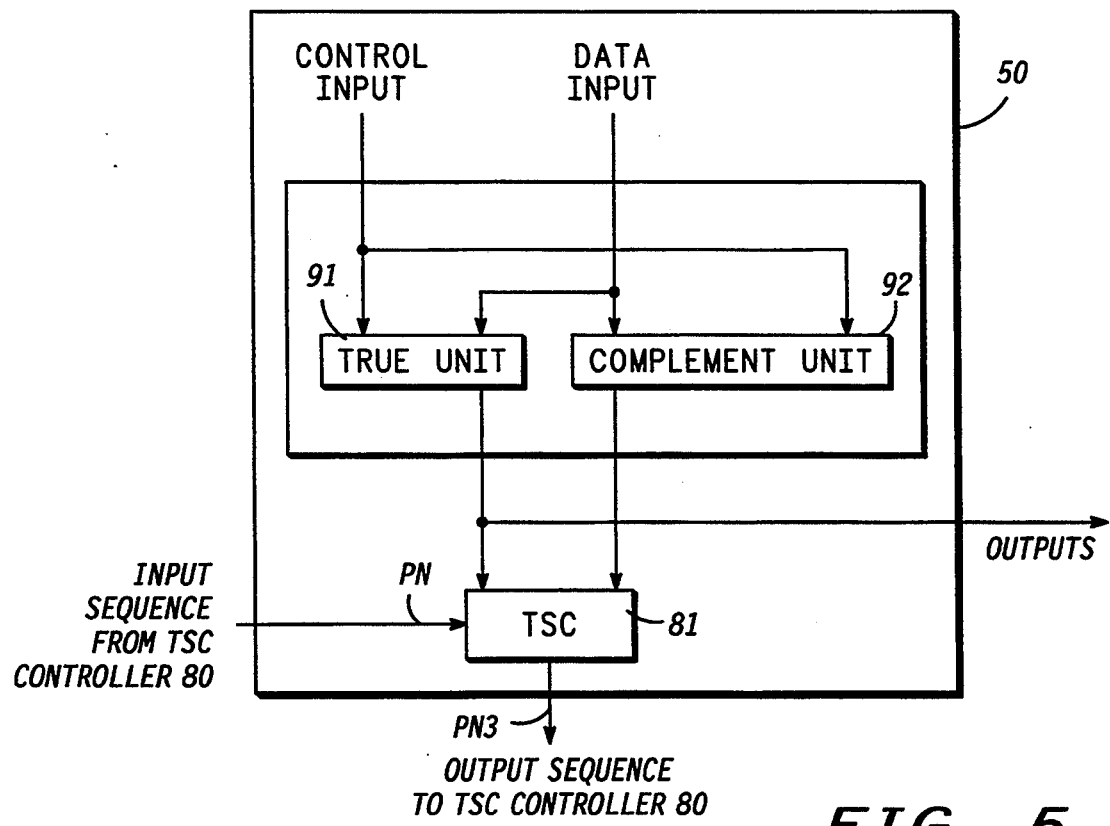
FIG. 5 is a block diagram of a total self-checking circuit in accordance with the present invention.

FIG. 5 depicts a block diagram of a typical functional unit 50-70 including its corresponding total self-checking circuit 81. The control outputs and data outputs of each functional unit are transmitted to true unit 91 and complement unit 92 as control input and data input. During normal failure-free operation of each functional unit 50-70, the outputs of the true unit 91 and complement unit 92 will always be complementary. The outputs of true unit 91 and complement unit 92 are coupled into TSC circuit 81. The true unit 91 and complement unit 92 must provide true and complement outputs for each signal that is monitored by TSC circuit 81. The input sequence PN is input to TSC 81 via the PN lead from TSC controller 80. The outputs of the true unit 91 and complement unit 92 must change state periodically and in synchronism according to the particular phase of the master sequence PN. The resultant phase is output on the P3 lead and transmitted to TSC controller 80. The output of the circuit may be taken either from the output of the true unit 91 or complement unit 92 depending on which sense of the signal is appropriate. The elements of the TSC circuit are totally self-checking as long as the inputs to the circuit 81 change state periodically. The true unit 91 and complement unit 92 must provide true and complement outputs for each signal that is to be monitored by the TSC circuit 81. The true and complement inputs from the true unit 91 and complement unit 92 respectively which are transmitted to TSC circuit 81 must be generated by separate units in order to achieve true error checking capability.

Figure 6:
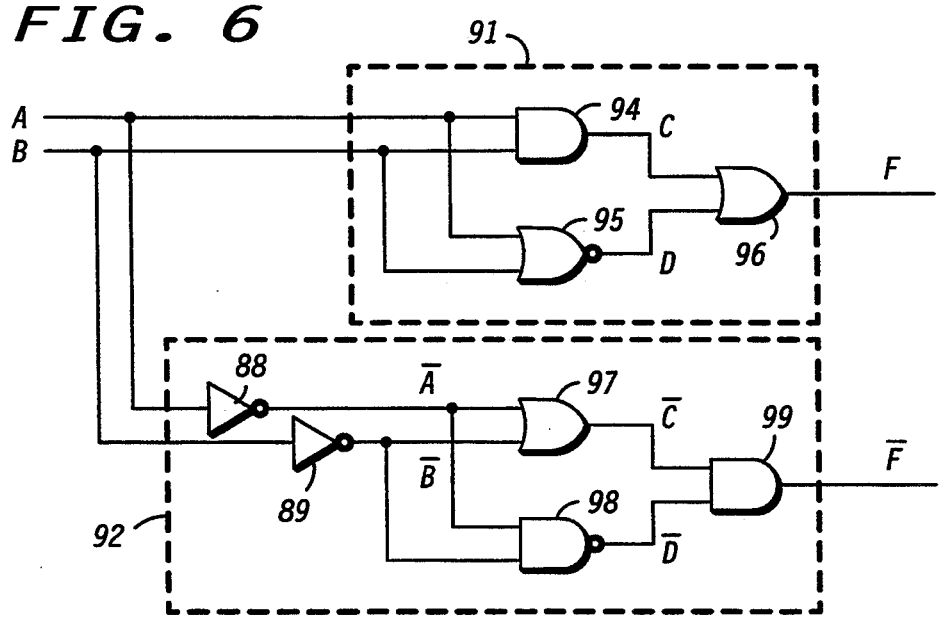
FIG. 6 is a logic diagram of the true unit and complement unit of FIG. 5.

FIG. 6 depicts the preferred embodiment of a true unit 91 and complement unit 92 of one of the functional units 50-70. True unit 91 includes AND gate 94 coupled to the A and B leads, NOR gate 95 coupled to the A and B leads, and OR gate coupled to the outputs of AND gate and NOR gate 95 and producing the F output on the corresponding lead.

Complement unit 92 includes inverters 88 and 89 coupled to the A and B leads. Inverters 88 and 89 invert the signals on the A and B leads to be the inverted signals on leads $\overline{A}$ and $\overline{B}$. Complement unit 92 further includes OR gate 97 coupled to inverters 88 and 89. In addition, complement unit 92 includes NAND gate 98 connected to inverters 88 and 89. OR gate 97 produces the $\overline{C}$ signal on the corresponding lead and NAND gate 98 produces the $\overline{D}$ signal on the corresponding lead. AND gate 99 is connected to OR gate 97 and NAND gate 98 via the $\overline{C}$ and $\overline{D}$ leads. AND gate 99 produces the F signal on the corresponding lead. Thus, as can be seen from Tables 1 and 2, any combinations of signals on the A and B leads will produce the F output from OR gate 96 of true unit 91 and the complement signal F from the AND gate 99 of complement unit 92. By the TSC circuit 88 comparing these two leads and tracking a pseudorandom PN sequence, it can determine whether there has been an error in the circuitry of each functional unit.

TABLE 1

| A | B | C | D | F |
|---|---|---|---|---|
| 0 | 0 | 0 | 1 | 1 |

TABLE 1-continued

| A | B | C | D | F |
|---|---|---|---|---|
| 0 | 1 | 0 | 0 | 0 |
| 1 | 1 | 1 | 0 | 1 |
| 1 | 0 | 0 | 0 | 0 |

TABLE 2

| $\overline{A}$ | $\overline{B}$ | $\overline{C}$ | $\overline{D}$ | $\overline{F}$ |
|---|---|---|---|---|
| 0 | 0 | 0 | 1 | 1 |
| 0 | 1 | 0 | 0 | 0 |
| 1 | 1 | 1 | 0 | 1 |
| 1 | 0 | 0 | 0 | 0 |

Figure 7:
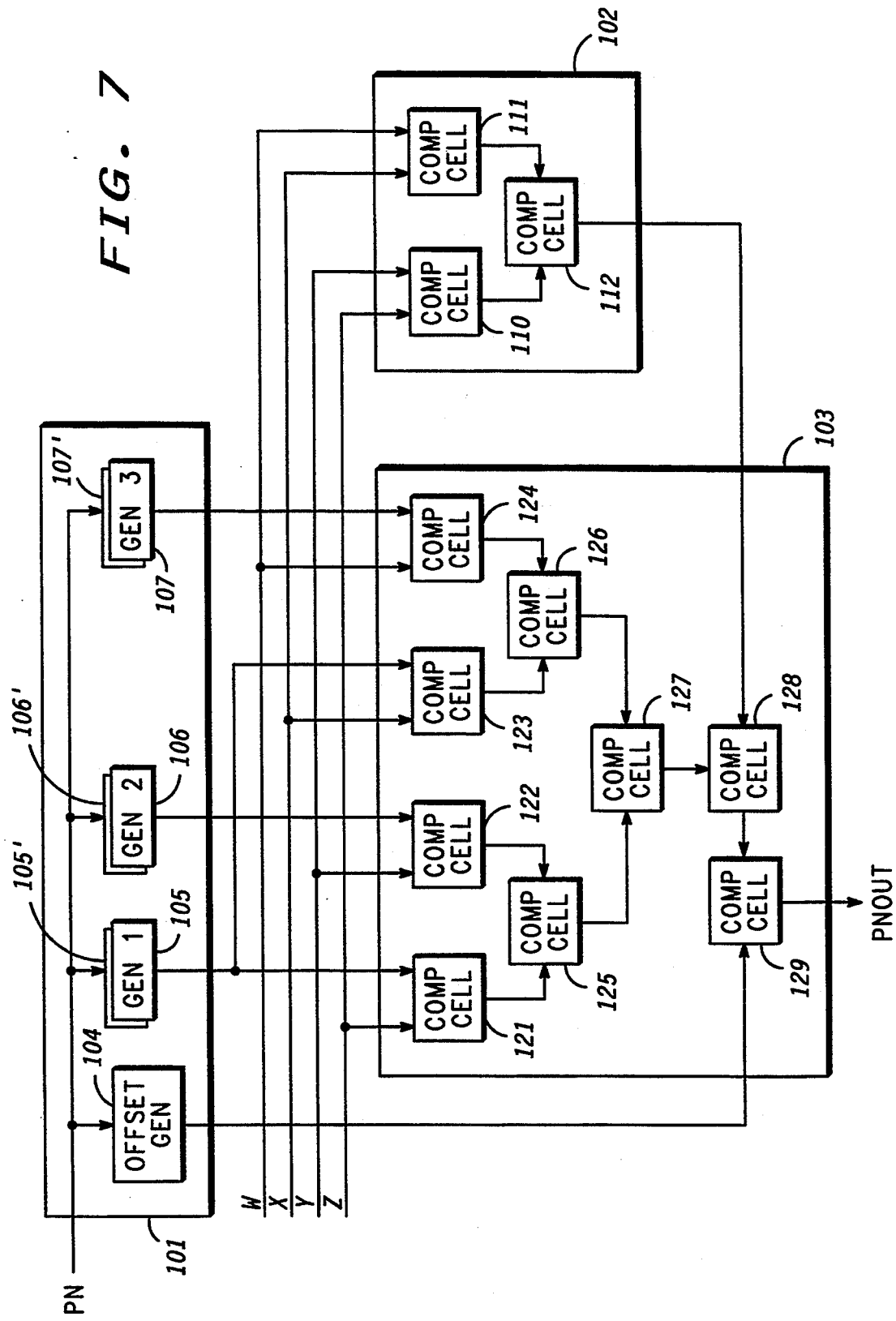
FIG. 7 is a block diagram of a total self-checking circuit in accordance with the present invention.

FIG. 7 depicts a block diagram of a typical TSC circuit 81. TSC circuit 81 includes sequence generator 101, parity checker 102, and parallel comparator 103. Sequence generator 101 includes offset generator 104 and generators 105-107. Each of the generators is connected in parallel to the TSC controller 80 via the PN lead. Sequence generator 101 produces a number of input combinations for transmission to parallel comparator 103 to produce the totally self-checking feature of TSC 81. Sequence generator 101 has a set of linear sequence generators 105-107 that are configured to produce a particular phase of the input sequence on the PN lead. Redundant sequence generators 105'-107' are used to produce along with the generators 105-107 the true and complementary signals for each output sequence derived from the PN sequence. In a failure occurs within any of the functional units, the output of the corresponding generator will not be the correct phase of the input sequence. As a result, the PN output signal of TSC 81 will be incorrect. This error will be detected by TSC controller 80 and the system will be shut down. Parity checker 102 has a set of comparator cells 110-112 which are coupled to the outputs of the functional unit via the W, X, Y, and Z leads. W and X leads are coupled to comparator cell 111, the Y and Z leads are coupled to comparator cell 110. The outputs of comparator cells 110 and 111 are coupled to comparator cell 112. If the outputs of the functional unit are complementary, the output of the parity checker will also be complementary. That is, if the signals on leads W and X are complementary and Y and Z are complementary, the output of comparator cell 112 will be a complementary signal.

Parallel comparator 103 includes a parallel/series set of comparator cells 121-129. Generator 105 and the Z lead are coupled to comparator cell 102. Generator 106 and the Y lead are coupled to comparator 122. Generator 105 and the X lead are coupled to comparator cell 123. Generator 107 and the W lead are coupled to comparator cell 124. The output of comparator cells 121 and 122 are coupled to comparator cell 125. Similarly, the output of comparator cells 123 and 124 are coupled to comparator cell 126. The output of comparator cells 125 and 126 are coupled to comparator cell 127. The output of comparator cells 112 and 127 are coupled to comparator cell 128. The output of comparator cells 128 and offset generator 104 are coupled to comparator cell 129 which produces the PN out signal on the corresponding lead.

During error-free operation of the functional unit 5070, the PN out of parallel comparator 103 will be identical to one of the input sequences of generators 105-107. Each comparator cell 120-129 of parallel comparator 103 verifies that input signal pairs from the redundant functional unit are complementary. If any of the input signal pairs are not complementary, the PN out of parallel comparator 103 will be forced to an error condition. The output of parity checker 102 from comparator cell 112 is compared to the parity check of comparator cell 127 by comparator cell 128. If the result of this parity check by comparator cell 128 is that these signals are equal, the parity of the input data will cancel out and the output of parallel comparator 103 will match one of the original input sequences. The particular PN sequence which is produced by PN out will depend on the configuration of the generators 105-107 as inputs to parallel comparator 103.

Figure 8:
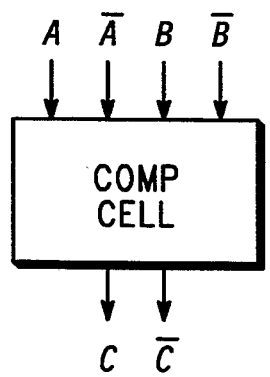
FIG. 8 is a block diagram of a comparator cell of FIG. 7.

Referring to FIG. 8, the comparator cell is shown in detail. The comparator of FIG. 8 is suitable for implementing the comparator cells 110-112 and 121-129 of FIG. 7.

As inputs to each comparator cell, there are two inputs A and B and their inverted form $\overline{A}$ and $\overline{B}$. The outputs of the comparator cell are C and $\overline{C}$. The signals A and $\overline{A}$, B and $\overline{B}$, and C and $\overline{C}$ are complementary signals. The function of the comparator cell is defined by the following equations:

$$C = (A \text{ AND } \overline{B}) \text{ OR } (\overline{A} \text{ AND } B) \quad \text{equation 1}$$

$$\overline{C} = (A \text{ AND } B) \text{ OR } (A \text{ AND } B) \quad \text{equation 2}$$

where AND is a Boolean AND operation and OR is a Boolean OR operation.

Figure 9:
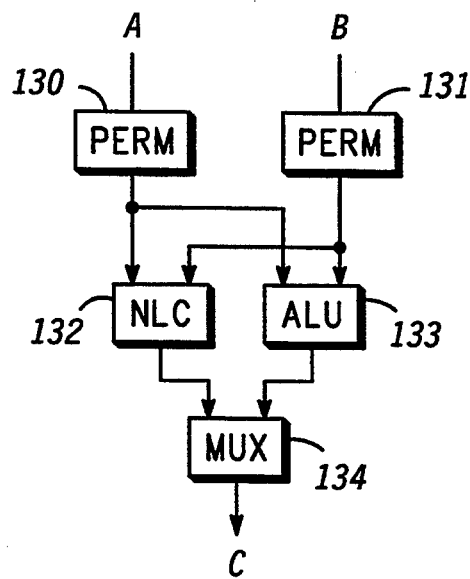
FIG. 9 is a block diagram of a series coupled permuter arrangement in accordance with the present invention.

An alternate configuration of the CLU 32 is shown in FIG. 9. This configuration includes two permuters 130 and 131. Permuter 130 is in series with the A bus input and NLC 132 and ALU 133. Permuter 131 is in series with the B bus input and NLC 132 and ALU 133. MUX 134 selects the output of NLC 132 or ALU 133 to be placed on the C bus output. Placing the permuters 130 and 131 in series with the A and B bus inputs enhances the performance of CLU 32 by allowing a permutation and either an ALU operation or a non-linear operation to be performed in a single instruction.

Figure 10:
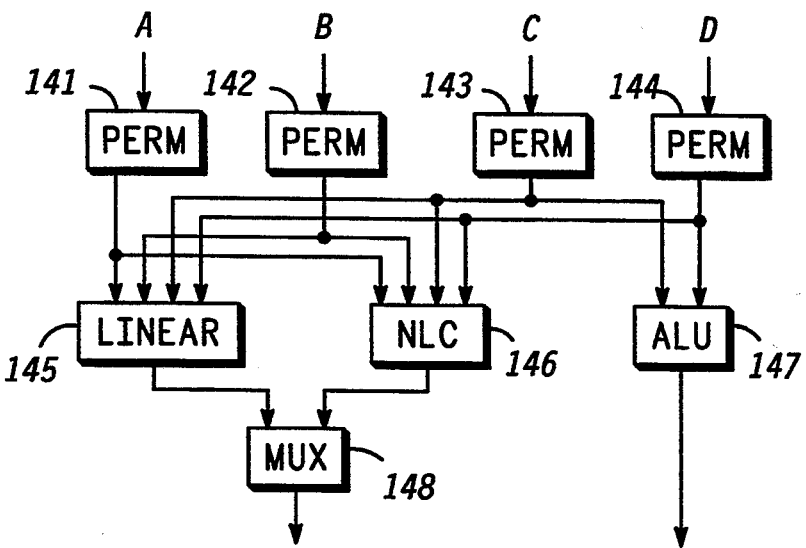
FIG. 10 is a block diagram of another series coupled permuter arrangement in accordance with the present invention.

Another alternate configuration of CLU 32 is shown in FIG. 10. This configuration illustrates more than two input buses and more than one output bus. Permuters 141, 142, 143 and 144 are coupled between four input buses A-D and linear combiner 145, NLC 146 and ALU 147. The E output bus is selected by MUX 148 to be either the output of linear combiner 145 or of NLC 146. The F output bus is coupled to the output of ALU 147. This configuration enhances the performance of the CLU 32 by allowing linear and non-linear operations on more than two inputs. Also, an ALU operation can be performed in parallel with either a linear or nonlinear operation.

The cryptographic logic unit described herein is a programmable, high performance, secure cryptographic engine. The cryptographic unit has the advantage of providing a programmable cryptographic algorithm implementation. High performance of the cryptographic logic unit is made possible by direct support of common cryptographic functions, such as permutations and non-linear combinations. Security which is an important part of any cryptographic engine is enhanced by the incorporation of total self-checking logic. This logic rapidly determines errors and prevents any output of the cryptographic engine should a fault be detected. The permuter and non-linear combiner of the cryptographic logic unit are configurable for flexibility in implementing different algorithms. As can be seen from the above, a programmable, highly flexible and secure cryptographic engine results from the cryptographic logic unit shown herein.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A secure cryptographic logic arrangement comprising:

a crypto processor for transmitting and receiving plain text data and cipher text data and for converting cipher text data to plain text data and for converting plain text data to cipher text data, said crypto processor including:

first and second input buses;

an output bus;

an arithmetic logic unit coupled to said first and second input buses and to said output bus;

a permuter coupled in parallel with said arithmetic logic unit to said first and second input buses and to said output bus;

a non-linear combiner coupled in parallel with said arithmetic logic unit and with said permuter to said first and second input buses and to said output bus; and a total self-checking controller coupled to said arithmetic logic unit, to said permuter and to said non-linear combiner, said total self-checking controller halting the processing of said crypto processor in response to detection of a fault in said crypto processor.

2. A secure cryptographic logic arrangement as claimed in claim 1, wherein there is further included a first processor for transmitting and receiving cipher text data, said first processor being coupled to said crypto processor via said first input bus.

3. A secure cryptographic logic arrangement as claimed in claim 2, wherein there is further included a second processor for transmitting and receiving plain text data, said second processor being coupled to said crypto processor via said second input bus.

4. A secure cryptographic logic arrangement as claimed in claim 1, wherein said crypto processor further includes an instruction processor coupled to said arithmetic logic unit, said permuter and said non-linear combiner, said instruction processor for controlling said arithmetic logic unit, said permuter and said non-linear combiner to perform operations for converting plain text to cipher text or cipher text to plain text according to a predefined encryption algorithm.

5. A secure cryptographic logic arrangement as claimed in claim 4, wherein said crypto processor further includes a register file coupled to said arithmetic logic unit, said permuter and said non-linear combiner via said first and second input buses and said output bus, said register file for storing intermediate results of an operation of said predefined encryption algorithm.

6. A secure cryptographic logic arrangement as claimed in claim 1, wherein said arithmetic logic unit, said permuter, and said non-linear combiner each include a total self-checking circuit, each said total self-checking circuit producing an output signal of a particular phase.

7. A secure cryptographic logic arrangement as claimed in claim 6, wherein said total self-checking controller includes a master generator coupled to each of said total self-checking circuits, said master generator transmitting a pseudorandom signal to each of said total self-checking circuits.

8. A secure cryptographic logic arrangement as claimed in claim 7, wherein said total self-checking controller further includes an alarm evaluator coupled to said master generator and to each of said total self-checking circuits, said alarm evaluator producing an alarm output for detection of a fault in any one of said arithmetic logic unit, said permuter, or said non-linear combiner.

9. A secure cryptographic logic arrangement as claimed in claim 8, wherein said master generator is coupled to said alarm evaluator, said master generator transmitting a plurality of phases of said pseudorandom signal to said alarm evaluator, each phase of said pseudorandom signal corresponding to a particular one of said total self-checking circuits.

10. A secure cryptographic logic arrangement as claimed in claim 8, wherein each of said arithmetic logic unit, said permuter, and said non-linear combiner includes:
a true unit coupled to a control input and a data input of said arithmetic logic unit, permuter, or non-linear combiner;
a complement unit coupled to said control input and to said data input of said arithmetic logic unit, permuter, or non-linear combiner;
said true unit providing non-inverted signals of said control input and said data input; and
said complement unit providing inverted signals of said control input and said data input.

11. A secure cryptographic logic arrangement as claimed in claim 10, wherein:
said total self-checking circuit of said arithmetic logic unit is coupled to said true unit and to said complement unit of said arithmetic logic unit, said total self-checking circuit of said arithmetic logic unit producing a first phase of said pseudorandom signal;
said total self-checking circuit of said permuter coupled to said true unit and to said complement unit of said permuter, said total self-checking circuit of said permuter producing a second phase of said pseudorandom signal; and
said total self-checking circuit of said nonlinear combiner coupled to said true unit and to said complement unit of said non-linear combiner, said total self-checking circuit of said non-linear combiner producing a third phase of said pseudorandom signal.

12. A secure cryptographic logic arrangement as claimed in claim 11, wherein said the alarm evaluator is coupled to said total self-checking circuit of said arithmetic logic unit, to said total self-checking circuit of said permuter, and to said total self-checking circuit of said non-linear combiner for receiving said first, said second, and said third phases of said pseudorandom signal, said alarm evaluator comparing said first, second, and third phases of said pseudorandom signal receiving from said total self-checking circuits with said plurality of phases transmitted by said master generator, said alarm evaluator producing said alarm output signal when any of said first, second, or third phases of said total self-checking circuits miscompare with said plurality of phases transmitted by said master generator.

13. A secure cryptographic logic arrangement as claimed in claim 10, wherein said true unit includes:
AND gating means coupled to said control input and to said data input;
NOR gating means coupled to said control input and to said data input; and
OR gating means coupled to said AND gating means and to said NOR gating means, said OR gating means producing a true output of said control input and said data input.

14. A secure cryptographic logic arrangement as claimed in claim 13, said complement unit including:
first inverting means for inverting said control input;
second inverting means for inverting said data input;
OR gating means coupled to said first and second inverting means;
NAND gating means coupled to said first and second 0 inverting means; and
AND gating means coupled to said OR gating and to said NAND gating means for producing a complement signal of said control input and said data input.

15. A secure cryptographic logic arrangement as claimed in claim 11, wherein each of said totally self-checking circuits includes:
sequence generator means coupled to said total self-checking controller;
parity check means for receiving said control input and said data input signals; and
parallel comparator means coupled to said sequence generator means and to said parity check means, said parallel comparator means for receiving said control input and said data input signals, said parallel comparator means providing said first, second or third phases of said pseudorandom signal.

16. A secure cryptographic logic arrangement as claimed in claim 15, wherein said sequence generator means includes a plurality of generator means for producing said first phase, said second phase, and said third phase of said pseudorandom signal and and offset phase.

17. A secure cryptographic logic arrangement as claimed in claim 15, wherein said parity check includes a plurality of comparator cells for producing a combination of said control input and said data input.

18. A secure cryptographic logic arrangement as claimed in claim 17, wherein said parallel comparator means includes a plurality of comparator cells for combining said combination of said control input and said data input, said control input and said data input and said first, second and third phases of said pseudorandom signal.

19. A secure cryptographic logic arrangement as claimed in claim 18, wherein each of said comparator cells includes A and B input signals and inverted versions said A and B signals, $\overline{A}$ and $\overline{B}$, and outputs C and an inverted version of C, $\overline{C}$, produced according to the following equations:

$$C = (A \text{ AND } \overline{B}) \text{ OR } (\overline{A} \text{ AND } B)$$

and $$C = (\overline{A} \text{ AND } \overline{B}) \text{ OR } (A \text{ AND } B).$$

20. Encryptor/decryptor for coupling processors in secure communications, said secure encryption/decryption arrangement comprising:
- a first processor for receiving and transmitting cipher text data;
- a second processor for receiving and transmitting plain text data;
- a crypto processor for transmitting and receiving plain text data from said second processor and for receiving and transmitting cipher text data from said first processor, said crypto processor for converting cipher text data to plain text data and for converting plain text data to cipher text data, said crypto processor including:
- first and second input buses;
- an output bus;
- an arithmetic logic unit coupled to said first and second input buses into said output bus;
- a permuter coupled in parallel with said arithmetic logic unit to said first and second input buses and to said output bus;
- a non-linear combiner coupled in parallel with said arithmetic logic unit and with said permuter to said first and second input buses and to said output bus;
- an instruction processor for controlling arithmetic logic unit, said permuter and said nonlinear combiner to perform encryption of plain text data and decryption of cipher text data according to a particular encryption/decryption algorithm, said instruction processor coupled to said arithmetic logic unit, said permuter and said non-linear combiner; and
- a total self-checking controller coupled to arithmetic logic unit, to said permuter, and to said non-linear combiner, said total self-checking controller halting the processing of said crypto processor in response to detection of a fault of said arithmetic logic unit, said permuter, or said non-linear combiner.

21. A secure cryptographic logic arrangement comprising:
- a crypto processor for transmitting and receiving plain text data and cipher text data and for converting cipher text data to plain text data and for converting plain text data to cipher text data, said crypto processor including:
- first and second input buses;
- an output bus;
- an arithmetic logic unit coupled to said first and second input buses and to said output bus;
- a non-linear combiner;
- permuter means coupled in series with said arithmetic logic unit and with said non-linear combiner to said first and second input buses and to said output bus;
- said non-linear combiner coupled in parallel with said arithmetic logic unit and with said permuter means to said first and second input buses and to said output bus; and
- a total self-checking controller coupled to said arithmetic logic unit, to said permuter means and to said non-linear combiner, said total self-checking controller halting the processing of said crypto processor in response to detection of a fault in said crypto processor.

22. A secure cryptographic logic arrangement comprising:
- a crypto processor for transmitting and receiving plain text data and cipher text data and for converting cipher text data to plain text data and for converting plain text data to cipher text data, said crypto processor including:
- at least four input buses;
- a plurality of output buses;
- an arithmetic logic unit coupled to said at least four input buses and to said plurality of output buses;
- a non-linear combiner;
- a linear combiner;
- permuter means coupled in series with said arithmetic logic unit, with said linear combiner and with said non-linear combiner to said at least four input buses and to said plurality of output buses;
- said non-linear combiner coupled in parallel with said arithmetic logic unit, with said linear combiner and to said at least four input buses and to said plurality of output buses;
- said linear combiner coupled in parallel with said arithmetic logic unit, with said nonlinear combiner and to said at least four input buses and to said plurality of output buses; said linear combiner or said non-linear combiner producing an output simultaneously with an output of said arithmetic logic unit; and
- an output of said arithmetic logic unit; and a total self-checking controller coupled to said arithmetic logic unit, to said permuter means and to said non-linear combiner, said total self checking controller halting the processing of said crypto processor in response to detection of a fault in said crypto processor.

* * * * *

UNITED STATES PATENT AND TRADEMARK OFFICE
CERTIFICATE OF CORRECTION

PATENT NO. : 5,365,591
DATED : November 15, 1994
INVENTOR(S) : Phillip A. Carswell et al.

It is certified that error appears in the above-indentified patent and that said Letters Patent is hereby corrected as shown below:

Column 10, claim 14, line 20, delete "0" at the beginning of the line.
Column 12, claim 22, line 45, delete "an output of said arithmetic logic unit; and" as it is a repeat of the previous line.

Signed and Sealed this

Twenty-third Day of April, 1996

Attest:

BRUCE LEHMAN

*Attesting Officer*   *Commissioner of Patents and Trademarks*